United States Patent
Chow

(10) Patent No.: US 7,448,984 B2
(45) Date of Patent: Nov. 11, 2008

(54) PASSIVE EXERCISE APPARATUS

(76) Inventor: Loyal Chow, 193 Berkley Ave., Belle Mead, NJ (US) 08502

( * ) Notice: Subject to any disclaimer, the term of this patent is extended or adjusted under 35 U.S.C. 154(b) by 735 days.

(21) Appl. No.: 11/012,045

(22) Filed: Dec. 15, 2004

(65) Prior Publication Data

US 2005/0137506 A1    Jun. 23, 2005

Related U.S. Application Data

(60) Provisional application No. 60/532,103, filed on Dec. 23, 2003.

(51) Int. Cl.
*A63B 71/00* (2006.01)
*A61H 1/00* (2006.01)

(52) U.S. Cl. .................. 482/8; 482/1; 482/9; 601/1; 601/23; 601/24

(58) Field of Classification Search ............ 601/5, 601/23, 24, 49–55, 104, 140, 143, 149, 89–103, 601/150; 482/1–9, 900–902
See application file for complete search history.

(56) References Cited

U.S. PATENT DOCUMENTS 4,596,240 A * 6/1986 Takahashi et al. ............ 601/40
4,986,260 A * 1/1991 Iams et al. .................... 601/43
5,297,541 A * 3/1994 Hensey ......................... 601/40
5,507,792 A * 4/1996 Mason et al. ................ 607/104
5,711,760 A * 1/1998 Ibrahim et al. .............. 601/149
6,544,203 B2 * 4/2003 Hazard ........................ 601/150
6,692,451 B2 * 2/2004 Splane, Jr. ...................... 601/5
6,916,300 B2 * 7/2005 Hester et al. ................ 601/149

* cited by examiner

*Primary Examiner*—Glenn Richman
(74) *Attorney, Agent, or Firm*—James Ray & Assoc.

(57) ABSTRACT

Apparatus for passively exercising at least a portion of a human body includes an inflatable bag which exerts a force during inflation, an electrical air pump disposed in fluid communication with the bag for supplying an atmospheric air medium to inflate the bag, a solenoid valve disposed in fluid communication with the inflatable bag for discharging the atmospheric air medium to deflate the bag and a timing control circuit coupled to the pump and to the solenoid valve for cyclically inflating and deflating the bag. The control circuit includes a dual integrated circuit timer operable with an external resistor-capacitor timer control to provide such cyclical inflation and deflation of the bag. The duration of the cycle is adjusted with a variable resistor coupled to the dual timer. The apparatus can be integrated into a seat or an article of furniture.

3 Claims, 3 Drawing Sheets

PASSIVE EXERCISE APPARATUS

CROSS-REFERENCE TO RELATED APPLICATIONS

This application is related to and claims priority from U.S. Provisional Patent Application Ser. No. 60/532,103 filed on Dec. 23, 2003.

FIELD OF THE INVENTION

The present invention relates, in general, to a device for passively exercising a human body and, more particularly, the instant invention relates to a device for passively exercising a lumbar region of a spine or of lower limbs.

BACKGROUND OF THE INVENTION

The following background information is provided to assist the reader to understand the environment in which the invention will typically be used. The terms used herein are not intended to be limited to any particular narrow interpretation unless specifically stated otherwise in this document.

Most pains, such as back pains and numbness of lower limbs, can be associated with fatigued muscles and restricted blood circulation and may be caused with prolonged sitting. These pains can be reduced by an active exercise routine or by lying down or standing up to stretch and relax the muscles and improve blood circulation. However, performing such active exercises often times may not be possible in some working environments, or when traveling in a confined space, such as an automobile.

There are devices for passively exercising a portion of at least a human body, particularly, a lumbar region of a spine which are well known in the art.

U.S. Pat. No. 4,981,131 to R. Hazard teaches an apparatus for passively applying a force to the lumbar region of the spine utilizing an inflatable bladder in contact with the lumbar region which is pressurized and depressurized to effect a change lordosis. The pressurization and depressurization of the bladder is achieved with an air compressor pump and a plurality of solenoid valves and timers.

A pressure regulator installed intermediate an air supply source and the air compressor pump is included for controlling the pressure in the bladder at maximum inflation and for limiting such maximum pressure. The pressure regulator is either a precision variable pressure release valve type or a combination of such plurality of solenoid valves and timers.

U.S. Pat. No. 5,637,076 to R. Hazard et al teaches an improved apparatus incorporating a transducer element for monitoring and measuring forces produced by such inflatable bladder and a logic system responsive to the output of the transducer for controlling the application of force. A single valve is used for release of the pressure to the atmosphere for depressurization of such bladder.

Both U.S. Pat. Nos. 4,981,131 and 5,637,076 teach such an apparatus as either a portable device or one which can be integrated into a chair or a vehicle seat.

The primary disadvantage of such prior art devices is the complexity and added expense of the air supply and control arrangement to pressurize and depressurize the bladder and control the forces applied to the human body. An additional disadvantage of such prior art devices is a requirement to provide an air supply source.

U.S. Pat. No. 4,938,528 to G. Scott teaches a seat assembly with an inflatable bladder for adjustable seat support having an air delivery system for both pressurizing and depressurizing the bladder utilizing a one-directional motor driven pump and a plurality of valves selectively operable to communicate the pump outlet with the bladder and the pump inlet with atmosphere for inflating the bladder and selectively operable to communicate the pump inlet with the bladder and the pump outlet with atmosphere to deflate the bladder. This air delivery system also utilizes one or more spring biased check valves.

The air supply and control arrangement reduces the complexity and expense of the arrangement taught by U.S. Pat. Nos. 4,981,131 and 5,637,076 but requires manual control of pressurizing and depressurizing the bladder therefore rendering it impractical for passive exercising of the human body.

A variety of existing portable massaging devices for exercising a portion of the human body utilize small electric motors to generate vibration only strong enough to tickle the body which is not sufficient to adequately exercise and relax the muscles.

Therefore, it is desired to improve presently available devices for passively exercising at least a portion of the human body.

Additionally, those persons requiring monitoring of the blood pressure use noninvasive blood pressure measuring devices which generally include a compression cuff containing an inflatable bladder, a flexible tube attached to the inflatable bladder at one end and attached to a bulb at the other end for manual inflating of such bladder, a control valve is disposed adjacent the bulb for deflating the bladder and a display means is provided for displaying the measured blood pressure. The compression cuff has sufficient length to wrap around the persons arm and has a retaining means, generally of a velcro type to secure the compression cuff on the arm during blood pressure measurement.

It is desirable to adapt such blood measuring device for passively exercising at least a portion of the human body for cost advantage reasons.

SUMMARY OF THE INVENTION

The apparatus for passively exercising at least a portion of the human body by selectively applying a predetermined force and removing the force therefrom includes an inflatable element of a predetermined size and a predetermined contour engageable with the at least a portion of a human body. An electrical pump is disposed in fluid communication with the inflatable element and operable for supplying a fluid medium to at least one sealed fluid chamber disposed therein thus enabling movement of the inflatable element in a first direction to apply the predetermined force onto the at least a portion of the human body. A solenoid valve is disposed in fluid communication with the inflatable means and operable for discharging the fluid medium from the at least one sealed fluid chamber thus enabling movement of the inflatable element in a second direction to remove the predetermined force from the at least a portion of the human body. The fluid medium is preferably an atmospheric air medium. A control apparatus is connected with the solenoid and a motor portion of the pump for cyclically moving the inflatable element in the first and second direction. The control circuit includes a dual integrated circuit timer operable with a pair of external resistor-capacitor timer controls and upon supply of the operating voltage to provide a pair of timing signals to enable such cyclical inflation and deflation of the bag. The duration of the cycle is adjusted with a variable resistor coupled to the dual timer. A first power semiconductor is installed intermediate the pump motor and the dual timer to energize the pump motor when the first timing signal is available and deenergizes the pump motor when the first timing signal is removed.

Accordingly, the second power semiconductor is installed intermediate the solenoid and the dual timer to energize the solenoid when the second timing signal is available. Alternatively, the pair of timing signals may be provided by a pair of single integrated circuit timers, a pair of time delay relays, a pair of timers or a microprocessor capable of executing a predetermined software algorithm. A manual control switch is provided for activating and deactivating the apparatus. A voltage regulator may be provided when the supply voltage is different then the operating voltage The apparatus may be also utilized for static inflation by employing additional switches, preferably manually operable.

The apparatus may incorporate a flexible retaining means for attachment to a portion of the human body or to a rigid surface such as a vehicle seat or an article of furniture as well as being at least partially disposed within such vehicle seat or such article of furniture.

OBJECTS OF THE INVENTION

It is, therefore, one of the primary objects of the present invention to provide an apparatus for passively exercising at least a portion of the human body to relax fatigued muscles and improve blood circulation.

It is another object of the present invention to provide an apparatus for passively exercising at least a portion of the human body which incorporates an economical means for controlling pressurization and depressurization cycles.

It is a further object of the present invention to provide an apparatus for passively exercising at least a portion of the human body which does not require an air supply source.

It is yet a further object of the present invention to provide an apparatus for passively exercising at least a portion of the human body which is portable.

It is additional object of the present invention to provide an apparatus for passively exercising at least a portion of the human body which can be integrated into a chair or a vehicle seat.

It is an additional object of the present invention to provide an apparatus for passively exercising at least a portion of the human body which can utilize existing compression cuff technology from the blood pressure measuring device.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
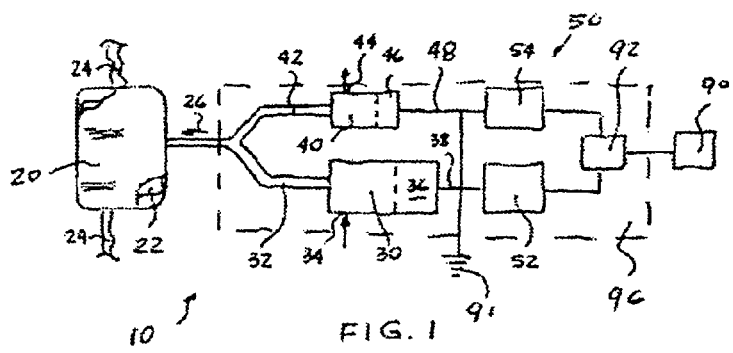
FIG. 1 is a diagrammatic representation of a passive exercise apparatus of a first embodiment of the present invention.

DESCRIPTION OF THE PRESENTLY PREFERRED AND VARIOUS ALTERNATIVE EMBODIMENTS OF THE INVENTION

Before describing the invention in detail, the reader is advised that, for the sake of clarity and understanding, identical components having identical functions have been marked where possible with the same reference numerals in each of the Figures provided in this document.

Figure 2:
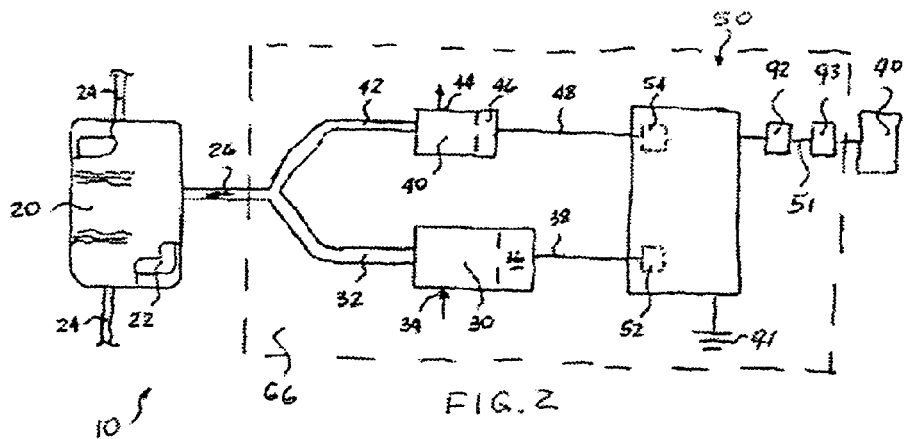
FIG. 2 is a diagrammatic representation of a passive exercise apparatus of a second embodiment of the present invention.
Figure 3:
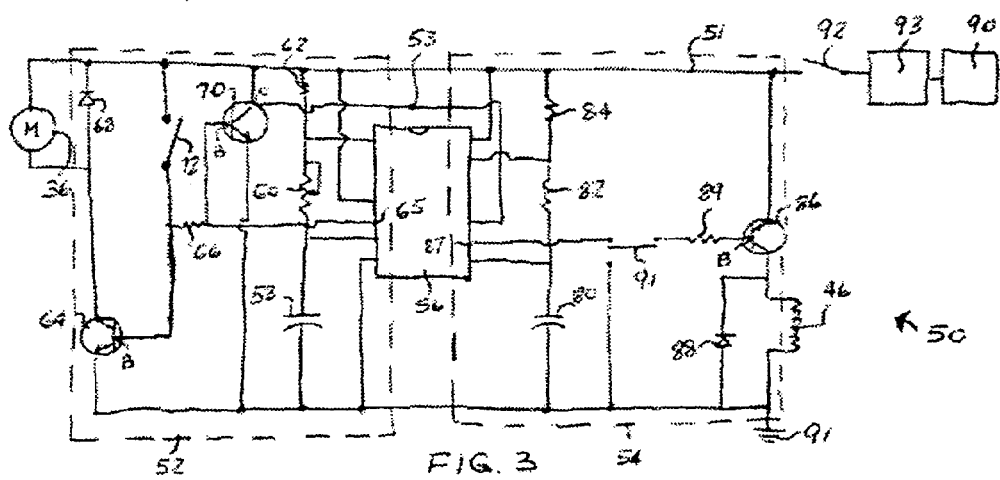
FIG. 3 is a schematic representation of the control means of a passive exercise apparatus of FIG. 2.
Figure 4:
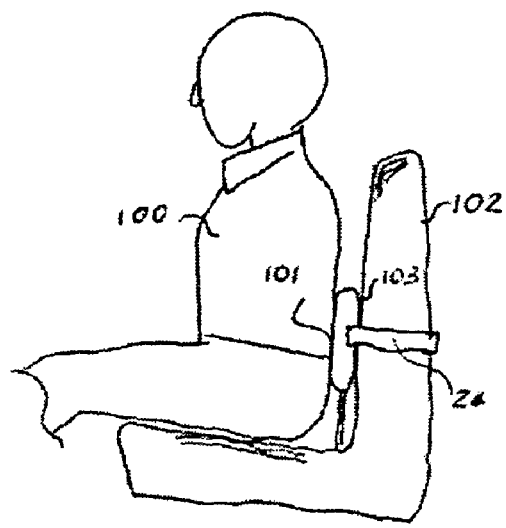
FIG. 4 is a diagram in side view of a passive exercise apparatus of the present invention arranged for use by a person seated in a chair particularly showing the air bag fully deflated.

A passive exercise apparatus, generally designated 10, is best shown in FIGS. 1-3 and includes a flexible inflatable means 20 of a predetermined size and a predetermined contour having at least one sealed fluid chamber 22 disposed therein. The means 20 is adapted to inflate upon charge of a fluid medium 26 into such at least one sealed fluid chamber 22 and deflate when the fluid medium 26 discharge is permitted. The inflatable means 20 may be one of any well known inflatable means, including but not limited to bag, bladder, bellow and cell. Preferably, such inflatable means 20 is a well known air bag 20.

The fluid medium 26 can be either gaseous or liquid and, preferably, such fluid medium 26 is an atmospheric air medium 26.

A means 30, preferably being an electric air pump 30 of a first predetermined fluid flow rating, is disposed in fluid communication with the airbag 20 via a first fluid connection 32 for pressurizing such air bag 20 with the atmospheric air medium 26 that enters such air pump 30 at an inlet 34 thereof upon energizing motor portion 36 of such air pump 30. During the pressurization, the air bag 20 moves in a first direction to inflate.

A means 40 is disposed in fluid communication with the airbag 20 via a second fluid connection 42 for discharge of the atmospheric air medium 26 from the at least one fluid chamber 22 through the outlet 44, subsequently depressurizing the air bag 20. During the depressurization, the air bag 20 moves in a second direction to deflate. It will be appreciated that such second direction is opposite to such first direction.

In the presently preferred embodiment, the means 40 is a valve 40 of a second predetermined fluid flow rating which includes a solenoid portion 46 for control thereof to discharge the atmospheric air medium 26 from at least one fluid chamber 22.

A control apparatus, generally designated 50, is disposed in electrical communication with the air pump 30 and the valve 40 via at least one first and at least one second electrical connection 38 and 48, respectively. Control apparatus 50 selectively energizes and deenergizes the motor portion 36 and solenoid portion 46 to inflate and deflate the air bag 20.

In particular reference to FIG. 1, the control apparatus 50 includes a first timer means 52 connected to a power source 90 and to electrical ground 91 for providing a first electrical timing signal of a first predetermined duration via the at least one first electrical connection 38 to energize the motor portion 36. Removal of the first electrical timing signal will de-energize the motor portion 36. A second timer means 54 is further connected to the power source 90 and to the electrical ground 91 for providing a second electrical timing signal of a second predetermined duration via the at least one second electrical connection 48 to energize the solenoid portion 46.

It will be appreciated that the first timer means 52 is disposed intermediate the power source 90 and the motor portion 36 and the second timer means 54 is disposed intermediate the power source 90 and the solenoid portion 46 to enable inflation and deflation of the air bag 20.

Each of the first and second timer means 52 and 54, respectively, may be a well known timer or a time delay relay connected in a circuit cyclically operable to first provide the first electrical timing signal to energize the air pump 30 for the first predetermined duration and then provide the second electrical timing signal to energize the valve 40 for the second predetermined duration thus enabling cyclical inflation and deflation of the inflatable means 20.

Preferably, each of the first and second timer means 52 and 54, respectively, is a monolithic integrated timing circuit operable with an external resistor-capacitor timer control of a predetermined configuration as best shown in FIG. 2.

In the presently most preferred embodiment of the present invention, best shown in FIG. 3, the first and second timer means 52 and 54 are provided by a well known dual monolithic integrated timing circuit 56 adapted for receiving a predetermined operating voltage 51 and operable in either astable or a mono-stable mode with each timing enabled by a pair of external resistor-capacitor timer controls of first and second predetermined configurations to independently generate such first and second electrical timing signals. In the present invention, such dual monolithic integrated timing circuit 56 is a dual timer NE556 available from a variety of manufacturers operable in the stable mode.

In further reference to FIG. 3, the first timer means 52 includes a first capacitor 58 having a first predetermined capacitance value and a pair of resistors 60 and 62 electrically coupled to the power source 90 and ground 91 and to the dual timer 56. A first load driver 64, such as a first switch means 64, is disposed intermediate the motor portion 36 and the first output 65 of the dual timer 56 for operating such motor portion 36 only upon receiving the first timing signal from the first output 65. In the exemplary embodiment, such first switch means 64 is, preferably, a well known power semiconductor such as a first transistor 64 which will enable an electrical current to flow therethrough when the first timing signal from the output 65 is applied to its gate G. It will be appreciated that the first switch means 64 is only biased under normal conditions and allowed to conduct only when the first timing signal is available from the first output 65.

A resistor 66 may be provided for converting the first timing signal being a voltage signal from the output 65 into a current signal in applications requiring such current signal for the first switch means 64 to conduct. A first diode 68 is provided for preventing reverse current flow damaging the first switch means 64.

Alternatively, such first load driver 64 may be a well known relay (not shown) having a coil thereof coupled to the first timing signal and having at least one contact set disposed intermediate the motor portion 36 and the power source 90, whereby presence of the first timing signal causes the coil to energize and enable passage of the electrical current from the power source 90 to the motor portion 36.

The second timer means 54 includes a second capacitor 80 having a second predetermined capacitance value and a pair of resistors 82 and 84 electrically coupled to the power source 90 and ground 91 and to the dual timer 56.

Preferably, a second load driver 86, such as a second switch means 86, is disposed intermediate the solenoid portion 46 and the second output 87 of the dual timer 56 for operating such solenoid portion 46 only upon receiving the second timing signal from the second output 87. Those skilled in the art will readily understand that such solenoid portion 46 may be disconnected from the power source 90 and be directly coupled to the second output 87 to be directly operated thereby.

Alternatively, such second load driver 64 may be a well known relay (not shown) having a coil thereof coupled to the second timing signal and having at least one contact set disposed intermediate the solenoid portion 46 and the power source 90.

In the exemplary embodiment, such second switch means 86 is, preferably, a well known power semiconductor such as a second transistor 86 which will enable an electrical current to flow therethrough when the second timing signal from the output 87 is drained to its gate G. It will be appreciated that the second switch means 86 is only biased when the second timing signal is available from the second output 87 and allowed to conduct only under normal conditions.

Alternatively, the second transistor 86 can be selected to conduct when the second timing signal from the output 87 is applied to its gate G. A resistor 89 may be provided for converting the second timing signal being a voltage signal from the output 87 into a current signal in applications requiring such current signal for the second switch means 86 to conduct. A second diode 88 is provided for preventing reverse current flow damaging the second switch means 86.

A third switching means, preferably a well known power semiconductor such as a third transistor 70 is provided as a logic inverter for changing the operating voltage 51 at its base B to a second voltage 53 having a second predetermined voltage value at its collector C. In the present invention, such second voltage 53 is less than such operating voltage 51.

In operation, supply of the operating voltage 51 to the dual timer 56 initiates charging of the first capacitor 58 and enables the dual timer 56 to provide the first timing signal causing the first transistor 64 to conduct and energize the motor portion 36 which enables the air pump 30 to start inflating the air bag 20. Inflation of the air bag 20 continues during the entire charging cycle of the first capacitor 58 which is controlled by the resistors 60 and 62. Advantageously, the resistor 60 is a variable resistor 60 providing a means to adjust the inflation cycle thus forming a predetermined cycling rate of the passive exercise apparatus 10.

The availability of the first timing signal causes the third transistor 70 to provide voltage 53 to the timing means 56 and disable the second timing signal causing, in the presently preferred embodiment, the second transistor 86 to energize solenoid portion 46 and close the valve 40.

When the first capacitor 58 is fully charged, the first timing signal is discontinued thus de-energizing the motor portion 36 and terminating inflation of the air bag 20. At about the same time, the third transistor 70 causes a reset of the dual timer 56 enabling it to provide a second timing signal causing the second transistor 86 to momentarily de-energize the solenoid portion 46 thus enabling the air bag 20 to deflate and further enabling the dual timer 56 to initiate a discharge cycle of the first capacitor 58 which is controlled by the resistor 60.

After the first capacitor 58 is fully discharged, it is enabled by the dual timer 56 to recharge thus cyclically repeating the inflation and deflation of the air bag 20.

The power source 90 is preferably of a DC type capable of providing a predetermined operating voltage 51 to the control apparatus 50, air pump 30 and valve 40 and may be coupled to a voltage regulator 93 in applications when such supply voltage is greater than such predetermined operating voltage 51. It will be appreciated that a power source 90 being a simple battery 90 providing the predetermined operating voltage 51 will be advantageous for portability of the passive exercise apparatus 10.

Those skilled in the art will readily understand that the passive exercise apparatus 10 will operate from an AC power source 90, such as an electrical outlet, by employing the voltage regulator 93 capable of AC to DC conversion.

The passive exercise apparatus 10 may be further adapted with a control switch means 92 disposed intermediate the control apparatus 50 and the power source 90 to provide the supply voltage to the passive exercise apparatus 10 for selectively activating and deactivating thereof. Preferably, the control switch means 92 is manually activated and deactivated.

A housing means 96 incorporating the air pump 30, the valve 40 and the control apparatus 50 may be provided for portability of the passive exercise apparatus 10.

Additionally, the passive exercise apparatus 10 may be adapted with a retaining means 24 for detachable attachment to a stationary surface or to at least a portion of a human body 100. Preferably, such retaining means 24 is flexible.

Figure 5:
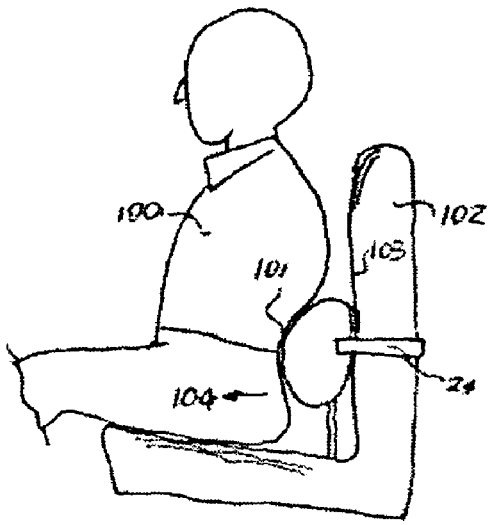
FIG. 5 is a diagram in side view of a passive exercise apparatus of the present invention arranged for use by a person seated in a chair particularly showing the air bag fully inflated.

The use and operation of the passive exercise apparatus 10 of the present invention is best shown in FIGS. 4-7. In a particular reference to FIG. 4, the passive exercise apparatus 10 is shown in a fully deflated condition and being disposed between a lumbar portion 101 of the human body 100 and a back portion 103 of a vehicle seat 102. Activation of the passive exercise apparatus 10 via the control switch 92 will enable the control apparatus 50 to generate the first electrical timing signal and energize the air pump 30 thus inflating the airbag 20 and applying a predetermined force 104 to the lumbar portion 101 as best shown in FIG. 5. Upon expiration of the first predetermined duration associated with the first timer means 52, the air pump 30 will de-energize and the control apparatus 50 will generate the second electrical timing signal enabling release of the atmospheric air medium 26 from the air bag 20 and removal of the predetermined force 104 from the lumbar portion 101. Upon expiration of the second predetermined duration associated with the second timer means 52, the control apparatus 50 will reactivate the first timer means 52 thus enabling cyclical inflation and deflation of the airbag 20 and a corresponding application and removal of the predetermined force 104.

Figure 6:
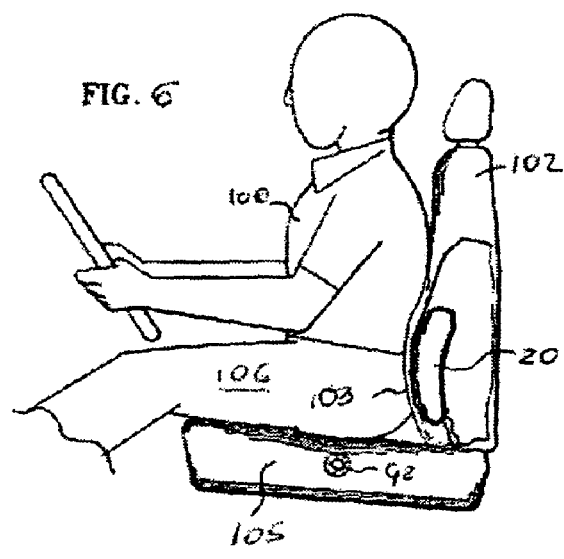
FIG. 6 is the diagram in side view of a passive exercise apparatus of a present invention arranged for use by a person seated in a vehicle seat particularly showing the air bag integral to the vehicle seat.

In particular reference to FIG. 6, the passive exercise apparatus 10 is at least partially integrated within the back portion 103 of the vehicle seat 102 and covered with an upholstery material that conceals the passive exercise apparatus 10 but does not interfere with inflation and deflation thereof.

Various alternative embodiments of the present invention will be understood as falling within the scope of the present invention. For example, in further reference to FIG. 3, the passive exercise apparatus 10 may be utilized in a statically inflated position by employing in combination a forth switch means 72 associated with the motor portion 36 and a fifth switch means 91 associated with the solenoid portion 46. For cyclical inflation and deflation of the air bag, the forth switch means 72 is maintained in a normally open position while the fifth switch means 91 is maintained in a normally closed position. Preferably, each of the forth switch means 72 and the fifth switch means 91 is manually operable. Closing of the forth switch means 72 will enable inflation of the air bag 20 while opening of the fifth switch means 91 will prevent deflation of the air bag 20 thus maintaining it in a statically inflated condition.

Further, the air bag 20 may be mounted within a generally horizontal seat cushion portion 105 of the vehicle seat 102.

It will be understood that an article of furniture including but not limited to a chair, recliner, rocker, couch, sofa, ottoman, bed, stool, desk, foot rest, keyboard support and wrist pad for use with a keyboard support may be utilized in place of the vehicle seat 102 to provide a passive exercise to at least a preselected portion of the human body 100.

Additionally, a plurality of air bags 20 may be disposed in fluid communication with the air pump 30 and the valve 40 and operable by the control apparatus 50. Employment of a plurality of air bags 20 will enable maintaining a predetermined force 104 while increasing an area of the human body 100 having such force 104 applied thereto.

Figure 7:
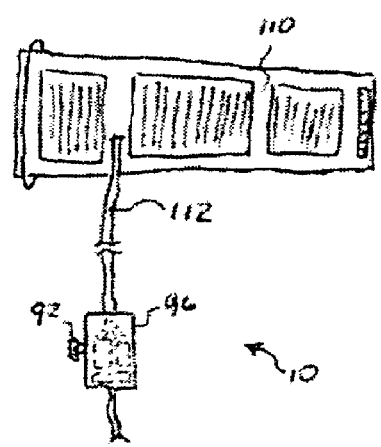
FIG. 7 is a plannar view of a passive exercise apparatus of the present invention in combination with a compression cuff of a blood measuring apparatus.

In a particular reference to FIG. 7, the air pump 30 and the valve 40 are disposed in fluid communication with the compression cuff 110 of a blood measuring device (not shown) via the flexible tubing 112 thereof thus enabling a conversion of such blood measuring device (not shown) for use as the passive exercise apparatus 10.

Figure 8:
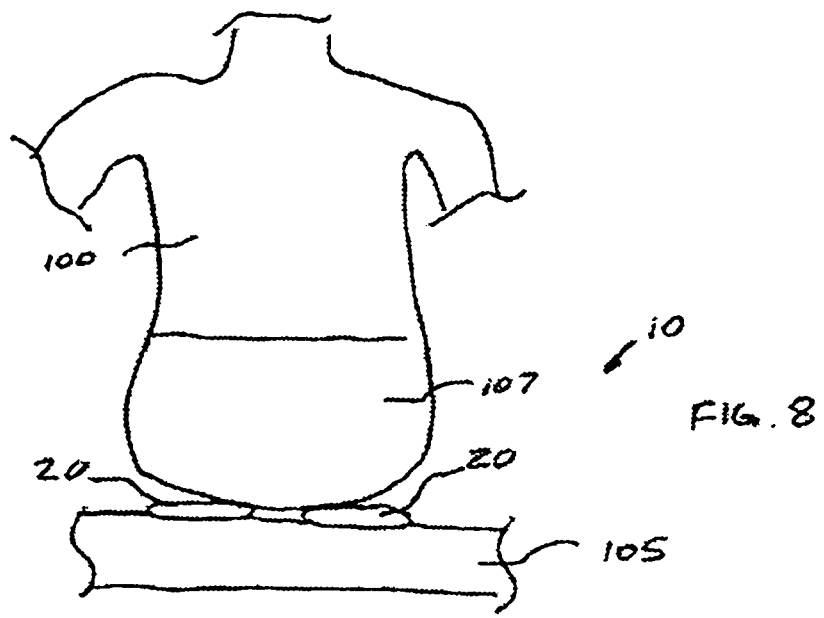
FIG. 8 is a partial elevation view of a passive exercise apparatus of the present invention in combination with a vehicle seat, particularly showing a pair of air bags engageable with a seat cushion.
Figure 9:
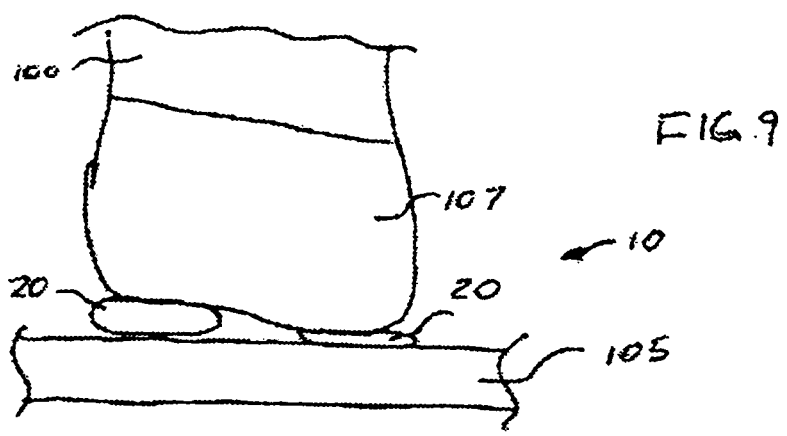
FIG. 9 is a partial elevation view of a passive exercise apparatus of FIG. 8, particularly showing a first air bag in an inflated condition for exercising a first side of the human body.
Figure 10:
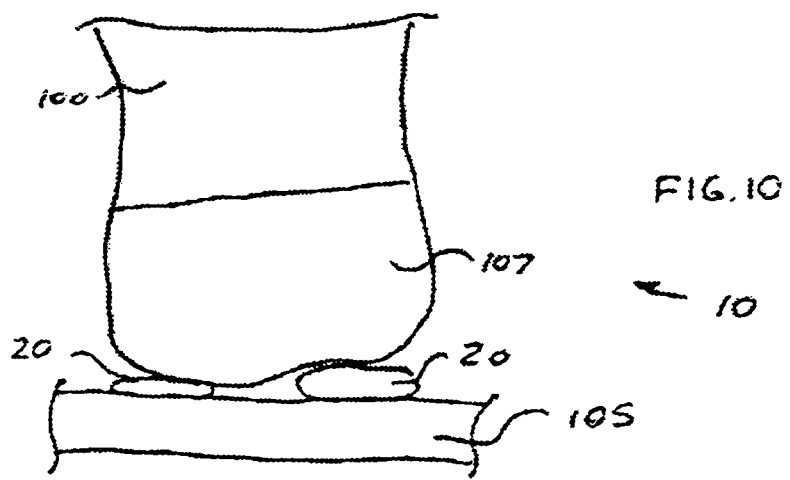
FIG. 10 is a partial elevation view of a passive exercise apparatus of FIG. 8, particularly showing a second air bag in an inflated condition for alternatively exercising a second side of the human body.

In some instances, a second passive exercise apparatus 10 may be provided for alternatively inflating and deflating thereof. Such embodiment is best shown in FIGS. 8-10 by a pair of air bags 20 in combination with the seat cushion portion 105 of the vehicle seat 102. Such pair of air bags 20 is movable in the vertical direction enabling tilting each side of the pelvis and buttocks 107 in the alternating upward and downward motion and further enabling alternating passive exercising of each side of the lumbar portion 101, each buttock 107 and each leg thigh muscle portion 106.

FIG. 8 shows both air bags 20 in a deflated condition. FIG. 9 shows a first air bag 20 in an inflated condition tilting the respective side of the body 100. FIG. 10 shows a second air bag 20 in the inflated condition tilting the opposite side of the body 100 while the first air bag 20 returns to the deflated condition. It will be appreciated that such embodiment will be applicable in combination with an article of furniture (not shown). The passive exercise apparatus 10 of the present invention may be also employed in combination within a seat, head rest or a foot rest of aircraft enabling muscle relaxation and improved blood circulation particularly during transcontinental flights.

Alternatively, the first electrical timing signal and the second electrical timing signal may be provided by a well known microprocessor 50 executing a predetermined software algorithm to enable cyclical inflation and deflation of the air bag 20.

While the presently preferred embodiment of the instant invention has been described in detail above in accordance with the patent statutes, it should be recognized that various other modifications and adaptations of the invention may be made by those persons who are skilled in the relevant art without departing from either the spirit of the invention or the scope of the appended claims.

I claim:

1. A passive exercise apparatus for selectively applying and removing a predetermined force to and from at least a portion of a human body, said passive exercise apparatus comprising:

a) at least one inflatable member having a predetermined size and a predetermined contour and engageable with said at least a portion of said human body and movable for generating said predetermined force, said at least one inflatable means having at least one sealed fluid chamber;

b) at least one fluid supply means disposed in fluid communication with said at least one sealed fluid chamber and operable for supplying a fluid medium thereto and moving said at least one inflatable member in a first direction to apply said predetermined force onto said at least a portion of said human body;

c) at least one fluid discharge means disposed in fluid communication with said at least one sealed fluid chamber and operable for discharging said fluid medium therefrom and moving said at least one inflatable member in a second direction to remove said predetermined force from said at least a portion of said human body; and d) at least one control apparatus disposed in electrical communication with a portion of said at least one fluid supply means and a portion of said at least one fluid discharge means for selectively enabling movement of said at least one inflatable member in said first and said second direction, said control apparatus including:
  i. a timing means connectable to said fluid supply means and said fluid discharge means for providing a first timing signal of a first predetermined duration to operate said fluid supply means and providing a second timing signal of a second predetermined duration to operate said fluid discharge means upon receiving an operating voltage from said power source, whereby operation of said fluid supply means pressurizes said at least one sealed fluid chamber with said fluid medium causing said at least one inflatable member to inflate and expand in said first direction, and whereby operation of said fluid discharge means depressurizes said at least one sealed fluid chamber causing said fluid medium to discharge therefrom and causing said at least one inflatable member to deflate and contract in said second direction, said second direction being opposite to said first direction,
  ii. a first capacitance means coupled to said timing means and operable in a first state for enabling said first predetermined duration of said first timing signal and operable in a second state for disabling said first timing signal,
  iii. a pair of a first resistive means serially coupled to said first capacitance means for operating it in said first state and in said second state and further coupled to said timing means for forming said first predetermined duration of said first timing signal,
  iv. a first load driver operatively coupled intermediate said fluid supply means and said timing means for operating said fluid supply means upon receiving said first timing signal from said timing means,
  v. a second capacitance means coupled to said timing means and operable in a third state for enabling said second predetermined duration of said second timing signal and operable in a forth state for disabling said second timing signal, and
  vi. a pair of second resistive means serially coupled to said second capacitance means for operating it in said third state and in said forth state and further coupled to said timing means for forming said second predetermined duration of said second timing signal.

2. A passive exercise apparatus according to claim 1, wherein said passive exercise apparatus includes a retaining member attached thereto.

3. A passive exercise apparatus according to claim 1, adapted for use in combination with one of a seat, an article of furniture and a combination thereof, said at least one inflatable member being at least one of rigidly attached, removably attached and integral to at least a portion thereof.

* * * * *